United States Patent [19]

Aulich et al.

[11] 4,243,296
[45] Jan. 6, 1981

[54] OPTICAL UNIT HAVING A LONGITUDINAL SIDE COUPLING ZONE

[75] Inventors: Hubert Aulich; Franz Auracher; Hans H. Witte, all of Munich, Fed. Rep. of Germany

[73] Assignee: Siemens Aktiengesellschaft, Berlin & Munich, Fed. Rep. of Germany

[21] Appl. No.: 22,705

[22] Filed: Mar. 22, 1979

Related U.S. Application Data

[63] Continuation-in-part of Ser. No. 946,521, Sep. 27, 1978, abandoned.

[30] Foreign Application Priority Data

Sep. 27, 1977 [DE] Fed. Rep. of Germany ....... 2743368

[51] Int. Cl.³ .............................................. G02B 5/14
[52] U.S. Cl. ................... 350/96.15; 65/3 A; 65/4 B
[58] Field of Search ............... 350/96.15, 96.16; 65/2, 65/3 R, 3 A, 4 A, 4 B

[56] References Cited

U.S. PATENT DOCUMENTS

| 3,579,316 | 5/1971 | Dyott et al. | 65/4 B |
| 3,933,455 | 1/1976 | Chown | 65/4 B |
| 4,008,061 | 2/1977 | Ramsay | 65/4 A |
| 4,054,366 | 10/1977 | Barnoski et al. | 350/96.15 |
| 4,083,625 | 4/1978 | Hudson | 350/96.15 |
| 4,087,156 | 5/1978 | Kao et al. | 350/96.15 X |
| 4,111,522 | 9/1978 | Auracher et al. | 350/96.21 |
| 4,113,345 | 9/1978 | Gerndt | 350/96.15 |

FOREIGN PATENT DOCUMENTS

| 2504819 | 2/1975 | Fed. Rep. of Germany . |
| 2812346 | 9/1978 | Fed. Rep. of Germany ........ 350/96.15 |

OTHER PUBLICATIONS

Barnoski, "Data Distribution Using Fiber Optics", Applied Optics, vol. 14, No. 11, Nov. 1975, pp. 2571-2577.
Ozeki et al., "Optical Directional Coupler . . . ", Appl. Phys. Ltrs., vol. 28, No. 9, May 1976, pp. 528-529.
Yamamoto et al., "A Large-Tolerant Single-Mode . . . ", Proc. of IEEE, Jun. 1976, pp. 1013-1014.
Barnoski et al., "Fabrication of an Access Coupler . . . ", Applied Optics, vol. 15, No. 11, Nov. 1976, pp. 2629-2630.
Kawasaki et al., "Low-Loss Access Coupler . . . ", Applied Optics, vol. 16, No. 7, Jul. 1977, pp. 1794-1795.
Hill et al., "Efficient Power Combiner . . . ", Applied Physics Letters, vol. 31, No. 11, Dec. 1977, pp. 740-742.

Primary Examiner—John K. Corbin
Assistant Examiner—John D. Lee
Attorney, Agent, or Firm—Hill, Van Santen, Steadman, Chiara & Simpson

[57] ABSTRACT

An optical unit having at least one longitudinal side coupling zone characterized by the unit comprising at least one glass fiber having a glass core with a glass cladding layer surrounding the core with a step in the index of refraction from a greater to a lower value occurring at the junction between the glass core and cladding layer, the cross section of the glass fiber remaining uniform along the entire length and the core having at least one constriction to form the longitudinal coupling zone. To form the optical unit, a device utilizing a double crucible with a nozzle opening of the inner crucible being arranged to discharge into the nozzle opening of the outer crucible and provided with a means for regulating the flow therethrough is utilized. If the unit includes a plurality of optical fibers, these fibers may be individually formed and held together by an adhesive, the cladding of the fiber may be fused together or the unit may be formed jointly by utilizing a crucible having a plurality of nozzle openings for the inner crucible so that a continuous cladding layer is disposed around a plurality of cores.

4 Claims, 8 Drawing Figures

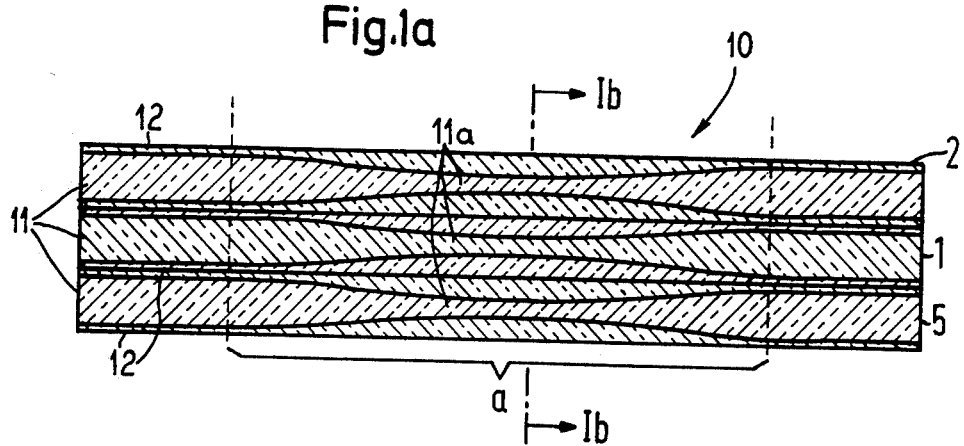
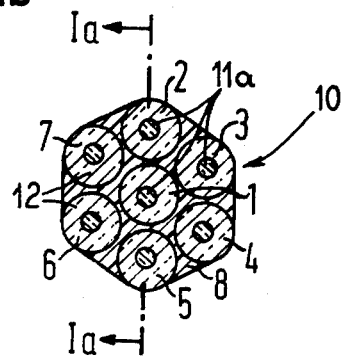
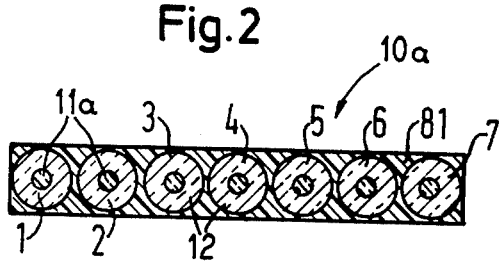

4,243,296

OPTICAL UNIT HAVING A LONGITUDINAL SIDE COUPLING ZONE

CROSS-REFERENCE TO RELATED APPLICATION

This application is a continuation-in-part of U.S. Patent application Ser. No. 946,521 filed Sept. 27, 1978, now abandoned.

BACKGROUND OF THE INVENTION

The present invention is directed to an optical unit having at least one longitudinal side coupling zone. The optical unit utilizes at least one glass fiber which has a core surrounded by a glass cladding layer with a step in the index of refraction from a higher to a lower value occurring at the junction between the core and the cladding layer.

Glass fibers having a core surrounded by a glass cladding layer are disclosed in an article by T. Ozeki and B. S. Kawasaki, "Optical Directional Coupler Using Tapered Sections In Multimode Fibers", *Applied Physics Letter*, Vol. 28, No. 9, 1 May 1976, pp. 528, 529. In this article, a longitudinal side coupling zone is formed by local constriction of the overall light conductor in which the core diameter and the casing diameter are consequently reduced in comparison to the diameter of the remaining portion of the fiber. Light conductors of this kind are used for mixers wherein the coupling zone of a plurality of light conductors are coalesced and it is endeavored to achieve as dense as possible packing. However, an increasing number of fibers impedes a dense packing because the difference between the diameter of the group in the coupling zone and outside the zone rapidly increases and subsequently the outer fibers are subjected to considerable deflection in the coupling zone. The bending stability and the target stability of individual fibers are subject to limits and these are particularly true in the zone of the constriction.

SUMMARY OF THE INVENTION

The present invention is directed to providing an optical unit having a side coupling zone which utilizes glass fibers which can be packed extremely densely in an arbitrary number without problems.

To accomplish these aims, the optical unit having at least one longitudinal side coupling zone utilizes at least one glass fiber having a glass core, a glass cladding layer surrounding the core with a step in the index of refraction from a greater to a lower value occurring at the junction between the glass core and the cladding layer with an improvement comprising the cross section of the glass fiber remaining uniform with constant outer dimensions along its entire length, but the core having at least one constriction to form a longitudinal coupling zone.

A glass fiber of this type is preferably produced using a device comprising a double crucible having an inner crucible with at least one nozzle opening arranged in an outer crucible with each nozzle opening of the inner crucible being arranged to discharge within a nozzle opening of the outer crucible, means to draw a fiber from said double crucible and means for regulating the flow through each nozzle opening of the inner crucible. The means for regulating flow preferably comprises a rod disposed in the inner crucible and being movable between a position obstructing flow through each nozzle opening of the inner crucible and a withdrawn position.

An advantageous embodiment of the device is characterized by a double crucible wherein the inner and outer crucibles are of a funnel shape and wherein the nozzle opening of the inner crucible is arranged in a plane formed by the nozzle opening of the outer crucible.

While the drawing device may form a single fiber, an advantageous embodiment of the invention has the inner crucible having at least two nozzle openings disposed to be surrounded by the nozzle opening of the outer crucible with each of the nozzle openings of the inner crucible being provided with the means for regulating flow therethrough so that each of the cores produced by the nozzles of the inner crucible are surrounded by a continuous cladding layer.

Another embodiment of the device is characterized by one or more than one of the nozzle openings of the crucibles having a rectangular configuration or shape. For example, if the nozzle of the outer crucible has a rectangular shape, a strip arrangement can be produced having a plurality of cores arranged in a row.

Preferably, the drawing device will include means for continuously measuring the thickness of the drawn fiber from the double crucible, means receiving a signal from the means for measuring and comparing the signal to a theoretical value or reference signal to produce an error signal and means utilizing the error signal to control the speed of the means to draw a fiber from said double crucible.

All of the drawing devices are operated in such a manner that the constriction in each core is produced by periodically reducing the flow through each nozzle opening of the inner crucible.

A glass fiber, such as that proposed in the present invention, also ensures a mechanical stability in the coupling zone and due to uniform cross section, a large number of the light conductors can be densely packed together. Furthermore, production of such a light conductor is simple and does not require any fundamental additional outlay in comparison to the production or normal light conductors in accordance with the double crucible method.

BRIEF DESCRIPTION OF THE DRAWINGS

FIG. 1a is a longitudinal cross-sectional view taken along lines Ia—Ia in FIG. 1b of an optical unit in accordance with the present invention;

FIG. 1b is a cross-sectional view through the optical unit of FIG. 1a taken along lines Ib—Ib;

FIG. 2 is a cross section through an optical unit in a strip form in accordance with the present invention;

FIG. 4b is a top plan view of the embodiment of FIG. 4a;

DESCRIPTION OF THE PREFERRED EMBODIMENTS

Figure 3:
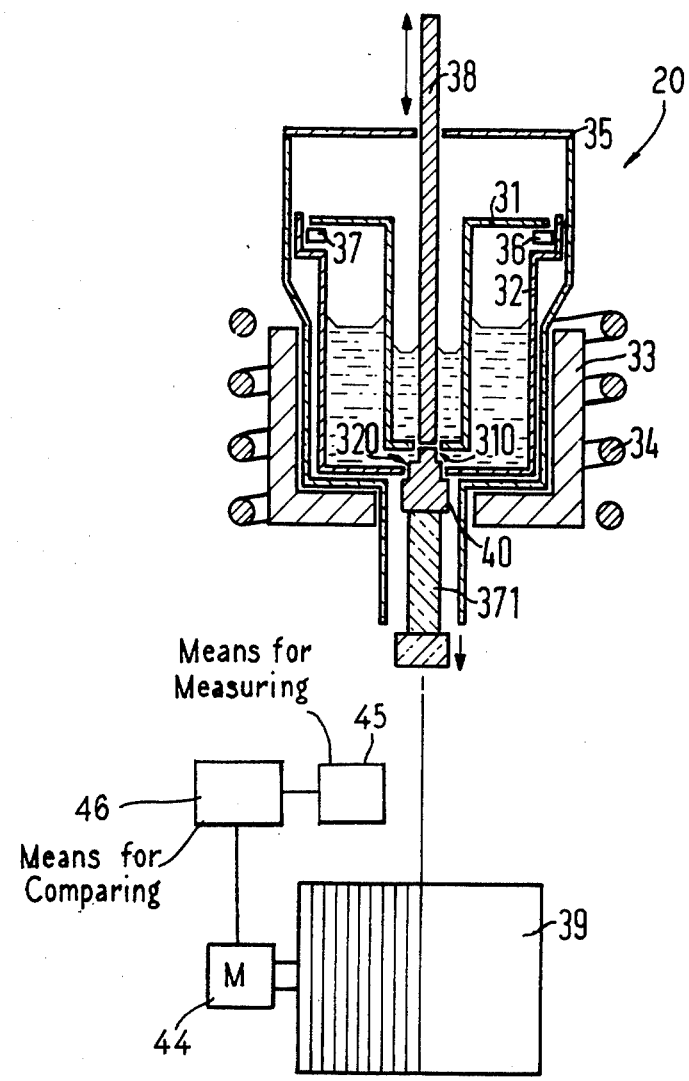
FIG. 3 is a view of a device in accordance with the present invention with portions in cross section for purposes of illustration.

The principles of the present invention are particularly useful in an optical unit generally indicated at 10 in FIGS. 1 and 2 which can be utilized as a mixer. As best illustrated in FIG. 1b, a central glass fiber 1 has six fibers 2–7 arranged closely therearound. As best illustrated in FIG. 1, each of the fibers such as 1, 2 and 5 has a glass core 11 surrounded by a glass cladding layer 12. In addition, each of the fibers has a uniform cross section with constant outer dimensions such as a constant diameter along its entire length. However, the cores 11 have a portion 11a, which has been constricted to form a side coupling section a (FIG. 1a). In the mixer 10, each of the fibers 1–7 are attached to each other by a light transmissive adhesive 8 so that the cavities between the various fibers are filled with the adhesive material. The index of refraction of the cores 11 are greater than the index of refraction of the cladding 12 and the boundary surface has a step decrease in the index of refraction. The adhesive material 8 has an index of refraction which will not be greater than the index of refraction of the cladding layers 12. Instead of utilizing an adhesive 8, the glass fibers can also be joined together by having the cladding layers fused together such as by applying heat.

When light conducted in a light conductor reaches the constricted area 11a of the core 11 which is the coupling section a, initially the higher modes will leave the core. As the cross-sectional constriction increases, increasing lower modes will also leave the core area. The light is now distributed over the entire cross section of the unit 10 which is filled by the fibers 1–7 and the adhesive material 8 and for the main part is conducted by total reflection at the boundary area or surface between the adhesive 8 and air and the fibers and air. This light will be recaptured as the core diameter begins to expand as a result of total reflection at the core cladding boundary areas and is then transferred outward in the cores of the outgoing fiber. In dependence upon the relative cross section constriction, the specific number of higher modes can be stripped off and the light can be distributed approximately uniformly between all the fibers whereas the remaining low modes are transmitted onward in the original fiber without mixing. Consequently, the mixer of the optical unit 10 can be mode selective.

The mixer can also be used as a mode selective distributor. In this case, it is excited at its input by a fiber, whose light is distributed between the outgoing fibers of the mixer. Two coupled fibers of this kind can also be constructed as a directional coupler as described in the publication mentioned hereinabove.

As best illustrated in FIG. 2, an optical unit is generally indicated at 10a and has a flat form. In the unit 10a, the glass fibers 1–7 are arranged in one plane. Similarly, as in the case of the unit 10, the are connected together by means of a light transmissive adhesive 81, whose index of refraction again may not exceed the index of refraction of the material forming the glass cladding 12. As in the previous embodiment, the adhesive 81 fills the interspaces between the various fibers. Alternately, the cladding of the fiber can be fused to one another. The details given above with respect to various alternate constructions of the unit 10 also apply to the unit 10a.

It is possible to dispense with the connection and filling of the individual fibers by means of adhesive if experimental arrangements, which will be described later, is used. In this arrangement the unit in group form of unit 10 or flat form of unit 10a can be drawn in one piece. In such an instance, the adhesive is consequently replaced from the start by the glass material forming the cladding layers.

It is advantageous for the design of the flat unit 10a to have the thickness of the unit to be equal to the diameter of the glass fibers 1–7 which are to be coupled together. By utilizing a planar thick film technique, which is similar to that disclosed in U.S. Pat. application Ser. No. 688,716, which issued as U.S. Pat. No. 4,111,52., (which is based on German OS 25 22 740) and the g ometry of the guide grooves for the fibers to be coupled together to be as disclosed in German Offenlegungsschrift 25 04 819, the incoming and outgoing fibers can be coupled to the mixer of the unit 10a with a very high degree of positioning accuracy.

As will be discussed later, it is possible to draw glass fibers of arbitrary length with a number of coupling zones. It is thus possible to produce a one piece optical unit which has a mixing zone and incoming and outgoing glass fiber light conductors so that the unit avoids the necessity of requiring the coupling of incoming and outgoing light conducting fibers to a mixer. Glass fiber light conductors of this type which are provided with coupling zones are particularly suitable for a star bus system, which is discussed by M. K. Barnoski, "Data Distribution Using Fiber Optics", *Applied Optics*, Vol. 14, No. 11, November 1975, pp. 2571–2677, as it is not essential to know the position of the coupling zone.

The constrictions in the coupling zones can be selected in accordance with the desired degree of mode mixing.

In the following, the production of a glass fiber conductor having a core surrounded by a glass cladding layer which fiber has a uniform cross section but has a constricted core will be described in detail. Here a modified double crucible method has proved to be particularly advantageous in producing these fibers.

In a conventional double crucible method, two crucibles are used with an inner crucible being inserted within an outer crucible. The base of each crucible is provided with at least one drawing nozzle in such a manner that a smaller drawing nozzle of the inner crucible is concentrically arranged to discharge within the larger nozzle of the outer crucible. The inner crucible is provided for the core glass melt and the outer crucible receives the glass melt for forming the cladding layer. Before the glass melts are produced, the nozzles are sealed from beneath with a plug. When the glass melts have been produced, the fiber drawing process can be initiated by pulling away the plug. The drawn fiber after passing through a coating device and a drying furnace, is then wound upon a fiber drawing drum by means of which the drawing speed can be simultaneously determined.

In order to produce a glass fiber having a constricted core, the double crucible device is modified in such a manner that each of the nozzle openings of the inner crucible are provided with means for regulating the flow therethrough. The constriction in the core is provided by the flow through the nozzle opening of the inner crucible being periodically reduced or suppressed. When the flow is suppressed, it should be ensured that the flow is increased again at the correct time before the complete elimination of the core.

A device for forming the glass fiber is generally indicated at 20 in FIG. 3 and includes a double crucible having an inner crucible 31 and an outer crucible 32. The inner and outer crucibles are composed of a material, for example 90% platinum with the remainder rhodium and are arranged in an extremely pure heat insulation 33 consisting of, for example $Al_2O_3$, and can be heated, for example inductively by means of a coil 34. As a protection from impurities, the double crucible is arranged in a protective jacket or globe 35 consisting of quartz glass. The cylindrical inner and outer crucibles have a diameter of 40 mm and 60 mm, respectively, and a height of 60 mm and 80 mm, respectively. As illustrated, they are arranged concentrically within one another. The spacing between the base of the inner crucible 31 and the outer crucible 32 can be set, for example, by means of spacers 36 and 37 which may consist of quartz glass. The inner crucible has a nozzle opening 310 which is concentrically arranged with respect to a nozzle opening 320 of the outer crucible. The nozzle opening 310 has a diameter of 2 mm while the nozzle opening 320 has a diameter of 4 mm and forms a drawing nozzle for the cladded fiber.

During the simultaneous melting of the material for the cladding in the outer crucible 32 and the core glass in the inner crucible 31, the two openings 310 and 320 are closed by a plug 40, which consists, for example, of 90% platinum and the remainder rhodium, in order to prevent the two types of glass from prematurely flowing out of the crucibles and becoming intermixed. The plug is secured, for example by $Na_2O\text{-}SiO_2\text{-}Al_2O_3$ glass to a quartz rod 371.

Arranged concentrically in the inner crucible is a rod 38, which consists, for example, of 90% platinum and the remainder rhodium and which, for example, can be moved vertically and parallel to the longitudinal axis of the crucible by electromagnetic means. The rod 38 is illustrated as having the same diameter as the opening 310 and serves as means for regulating the flow therethrough. As illustrated, the rod has a flat end face. A number of other possible designs are conceivable for the rod 38 of the means for regulating. For example, the end can be pointed so that the opening and rod cooperate in a manner of a pin type nozzle.

When a suitable drawing temperature has been reached, the fiber drawing process is initiated by withdrawing the plug 40 and the starting portion of the drawn fiber is secured to a drawing drum 39 with the drawing process being continued by rotating the drum through a drive 44. During the process, the means for regulating the flow comprising the rod 38 is moved to a withdrawn position with the end face of the rod 38 being spaced and withdrawn from the opening 310 so that a maximum flow of the core material can be obtained. With the maximum flow for the core material, the size or ratio of the core to the cladding diameter is determined by the dimensions of the crucible opening, the drawing temperatures, and the distance between the bases of the inner and outer crucible. The cross section of the fiber is maintained during the entire drawing process even though the dimensions of the core are changed or modified.

During the drawing process, the flow regulator such as the rod 38 can be moved to a position to reduce or suppress the flow through the nozzle opening 310 of the inner crucible. This is accomplished by moving the rod so that its end face has a shorter distance from the base and the rod closes off a portion of the opening as a plug. With a continued drawing of the fiber of a uniform diameter or uniform outer dimensions, the core diameter is constantly being restricted until it reaches a constant core diameter which conforms to the lesser flow. When the opening 310 is completely closed and the remaining core glass which is located between the crucible base has been drawn away, the core will disappear completely and the drawn glass fiber will consist only of the cladding material. The cross section of the fiber drawn in this way is fundamentally uniform as before.

By increasing the flow through the opening 310, it is possible to increase the diameter of the core as a result of which the cross section of the core of the glass fiber is again increased and thus, the aforementioned constriction is removed. The length and the minimum cross section of the constriction can be arbitrarily given within wide limits and set accordingly. In most frequent applications, the maximum possible constriction over the shortest possible lengths are required. In the production of such a glass fiber, the procedure is to fully suppress the flow through the opening 310, to wait until the desired narrowest cross section has been reached for the core and then reset the original flow for the opening 310. The length of the constriction can be varied by means of the drawing speed and the spacing between the base of the inner and outer crucibles. In the case of a large spacing, there is an increase in the fiber length with a uniform drawing speed on account of the greater residual volume of the core glass between the inner and outer crucible following the closure of the nozzle opening 310. On account of this constantly present residual volume and with a given drawing speed, a given minimum cross section and a given spacing between the crucible bases, the shortest constriction length, which can be achieved, may be calculated from the duration during which the residual volume is used up until the minimum cross section is reached.

Figure 4A:
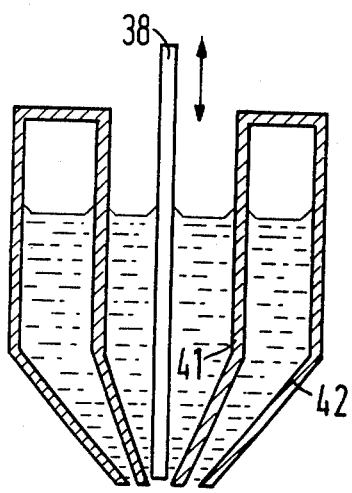
FIG. 4a is a cross-sectional longitudinal section of an embodiment of a double crucible used in a device in accordance with the present invention.
Figure 4B:
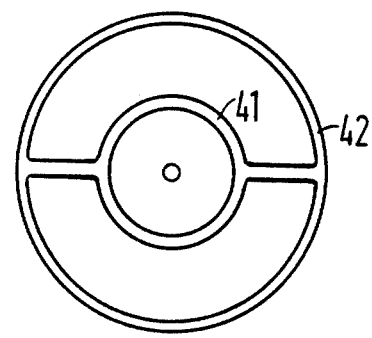

The influence of residual volume of this kind can be avoided by means of a double crucible as illustrated in FIGS. 4a and 4b. In this double crucible, the outer crucible 42 and the inner crucible 41 have a funnel formation or shape. The nozzle opening of the inner crucible 41 is arranged to lie in the plane of the opening nozzle of the outer crucible 42.

In order to obtain fibers, which are particularly precise with respect to the uniform cross section, it is expedient to continually measure the fiber thickness with means 45 for continually measuring or sensing the thickness of the drawn fiber from the double crucible. A signal produced by the means 45 for measuring is received by means 46 for receiving the signal and comparing it to a reference signal or theoretical value to produce an error signal. The error signal is applied to means for utilizing the error signal which operates the drive 44 for the drawing drum 39. Thus, if the fiber thickness is greater than the theoretical value, the speed of drawing is increased and if the thickness is less than the desired value, the speed of drawing is reduced to compensate or to correct for this condition.

It is also possible to produce coupling zones of arbitrary length and arbitrary numbers if the flow regulator is constantly set alternately to a greater and lesser flow. Following the drawing process, the fiber is divided into individual coupling zones from which the optical units can be reproduced by either joining the plurality of fibers together by an adhesive material or by fusion as discussed hereinabove.

Figure 5:
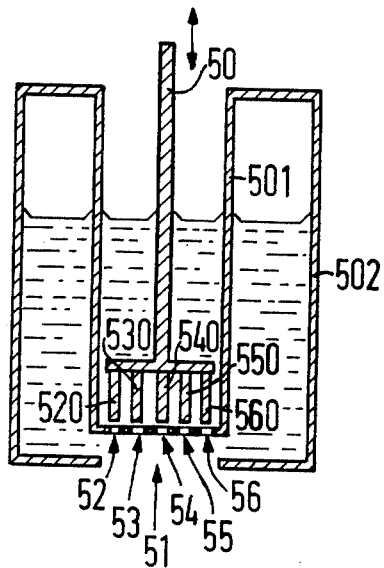
FIG. 5 is a longitudinal cross section of another embodiment of a double crucible utilized in the device of the present invention.

A modified double crucible is illustrated in FIG. 5 wherein a nozzle opening 51 of an outer crucible 502 surrounds a plurality of nozzle openings 52-56 of the inner crucible 501. Thus, a fiber having a plurality of cores surrounded by a continuous cladding material can be produced to provide an optical unit which is a compact, mode selective, multi-channel mixer and distributor element. The openings 52–56 of the inner crucible 501 can be arranged, for example, on a circle or in a row or in some other arbitrary pattern. All the nozzle openings 52–56 can be closed simultaneously by plugs 520–560 which are secured to a common rod 50 which forms means for regulating or controlling the flow from each of the nozzle openings of the inner crucible. The rod 50 operates in a manner similar to that of the rod 38 discussed with respect to the device 20.

Figure 6:
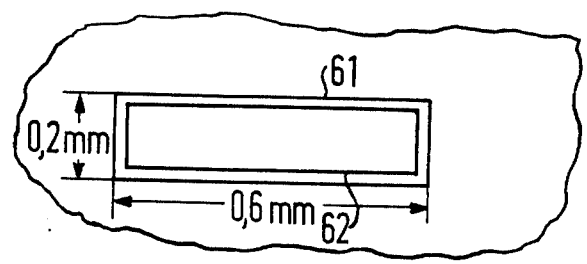
FIG. 6 is an enlarged view illustrating the nozzle openings having rectangular cross section in accordance with the present invention.

In the previous devices, the nozzle openings contained a circular configuration. However, the nozzle openings can also have a rectangular configuration. If the device is to produce a strip similar to 10a of FIG. 2, the outer nozzle openings such as 51 are rectangular and the openings 52–56 are arranged in a line or row. In addition, as illustrated in FIG. 6, the nozzles of both the inner and outer crucibles may have a rectangular configuration. As illustrated, the border of the nozzle openings 61 of the outer crucible surrounds a border of the nozzle opening 62 of the inner crucible. The nozzle opening of the inner crucible will be closed by means for regulating such as a rod which, of course, will possess a corresponding rectangular cross section.

An example of the coupling fiber was produced by using a lead glass for the core material and casing material with the following approximate compositions, respectively:

|  | Core Material | Cladding Material |
|---|---|---|
| $SiO_2$ | 41% | 50% |
| PbO | 44 | 33 |
| $Na_2O$ | 6 | 11 |
| $K_2O$ | 9 | 6 |

The diameter of the opening of the inner crucible is 2 mm and the diameter of the opening in the outer crucible is 4 mm. The spacing between the crucible bottoms is 1–2 mm and the pull temperature is approximately 700° C.

The time during which the opening of the inner crucible is closed by the rod 38 of the flow regulating means is dependent upon the pulling speed and upon the desire length of the coupling section a (FIG. 1a). Since the shortest possible length for the coupling section is desired, the pulling speed should not be too high. With a fiber pulling speed of 10 m/min and a closing duration of approximately 1 sec., the length of coupling section a between 10 and 20 cm will be produced. A shorter length for the coupling section can be obtained by using slower fiber pulling speeds.

Although various minor modifications may be suggested by those versed in the art, it should be understood that we wish to embody within the scope of the patent warranted hereon, all such modifications as reasonably and properly come within the scope of our contribution to the art.

We claim:

1. In an optical unit having at least one longitudinal side coupling zone, said unit comprising at least one glass fiber having a glass core, a glass cladding layer surrounding the core with a step in the index of refraction from a greater to a lower value occurring at the junction between the glass core and the cladding layer, the improvement comprising the cross section of each glass fiber remaining uniform with constant outer dimensions along the entire length of the fiber and the core having at least one constriction to form the longitudinal coupling zone for each fiber.

2. In an optical unit according to claim 1, wherein the unit includes more than one core, said cores being surrounded by the same cladding material and each of the cores having at least one constriction occurring at the same longitudinal coupling zone of the optical unit.

3. In an optical unit according to claim 1, wherein said unit has a plurality of glass fibers, each fiber comprising a core surrounded by a cladding layer with each of the fibers having a constant cross section and each of the cores having at least one constriction located along the same length to form a longitudinal coupling area.

4. In an optical unit according to claim 3, wherein all of the fibers are surrounded by an adhesive material having an index of refraction not exceeding the index of refraction of the cladding material of the glass fibers.

* * * * *